June 25, 1963  C. R. HANNA ETAL  3,095,214
FLUID POWER APPARATUS

Filed July 7, 1961  2 Sheets-Sheet 1

Fig. I.

WITNESSES:
Bernard R. Gieguey
Clement J. Poznokas

INVENTORS
Clinton R. Hanna and
Lawrence B. Lynn.
BY
N. M. Brodahl
ATTORNEY

United States Patent Office 3,095,214
Patented June 25, 1963

3,095,214
FLUID POWER APPARATUS
Clinton R. Hanna, Fort Lauderdale, Fla., and Lawrence B. Lynn, Clarence, N.Y., assignors to Westinghouse Electric Corporation, East Pittsburgh, Pa., a corporation of Pennsylvania
Filed July 7, 1961, Ser. No. 122,459
3 Claims. (Cl. 280—124)

This invention relates to fluid power apparatus, and more particularly to vehicle stabilizing apparatus employing fluid power (actuator type) shock absorbers.

While this invention is related to the general fluid power field, specific aspects of it are related to components and systems disclosed in U.S. Patent No. 2,976,-052 and in U.S. patent application Serial No. 775,430, filed November 21, 1958, directed to vehicle stabilization.

These vehicle stabilization systems include an acceleration responsive pilot circuit for controlling respective power and exhaust valves, which in turn control fluid flow in and out of an expansible chamber of a power actuator coupled between the sprung and unsprung masses of a vehicle. One phase of the invention is directed to a system which lends itself to an extremely compact arrangement. Another feature of the invention is a compensating piston that bears against an inertia sensing mass and is located in an off-center axial bore in a cylindrical plug that is normally clamped but which may be loosened and rotated to eccentrically adjust the position of the compensating piston with respect to the inertia sensing mass.

In accordance with one embodiment of the invention, fluid into and out of an expansible chamber of a fluid power shock absorber is controlled by supply and exhaust valves controlled by an inertia responsive pilot circuit that includes an inertia sensing weight against which a compensating piston physically bears, which piston is located in an off-center axial bore in a cylindrical plug that is normally clamped but which may be loosened and rotated to eccentrically adjust the position of the compensating piston.

It is, therefore, an object of the present invention to provide new and improved fluid power component and system structure.

Another object is to provide a more compact acceleration responsive sensing and control unit for controlling fluid flow in and out of a fluid power actuator.

Another object of the invention is to provide in a sensing unit having an acceleration responsive mass, an adjustable, condition-responsive fluid pressure operated means acting on the mass for compensating for variations in a condition.

A further object of the invention is to provide any one or more of the above desired enumerated features in a vehicle stabilization system.

Further objects and advantages of the present invention will be apparent from the following description, reference being had to the accompanying drawings, wherein a preferred form of the present invention is clearly shown.

In the drawings:

FIGURE 1 is a semi-diagrammatic view of a preferred form of the invention as embodied in a vehicle stabilizing system. Predominant in this figure is a sectioned view of an acceleration responsive sensing and control unit for controlling fluid flow into and out of a fluid power actuator-type shock absorber. In order to show the details of the sensing and control unit, the proportions between this unit and other parts of the system are exaggerated in FIG. 1;

Figure 1:
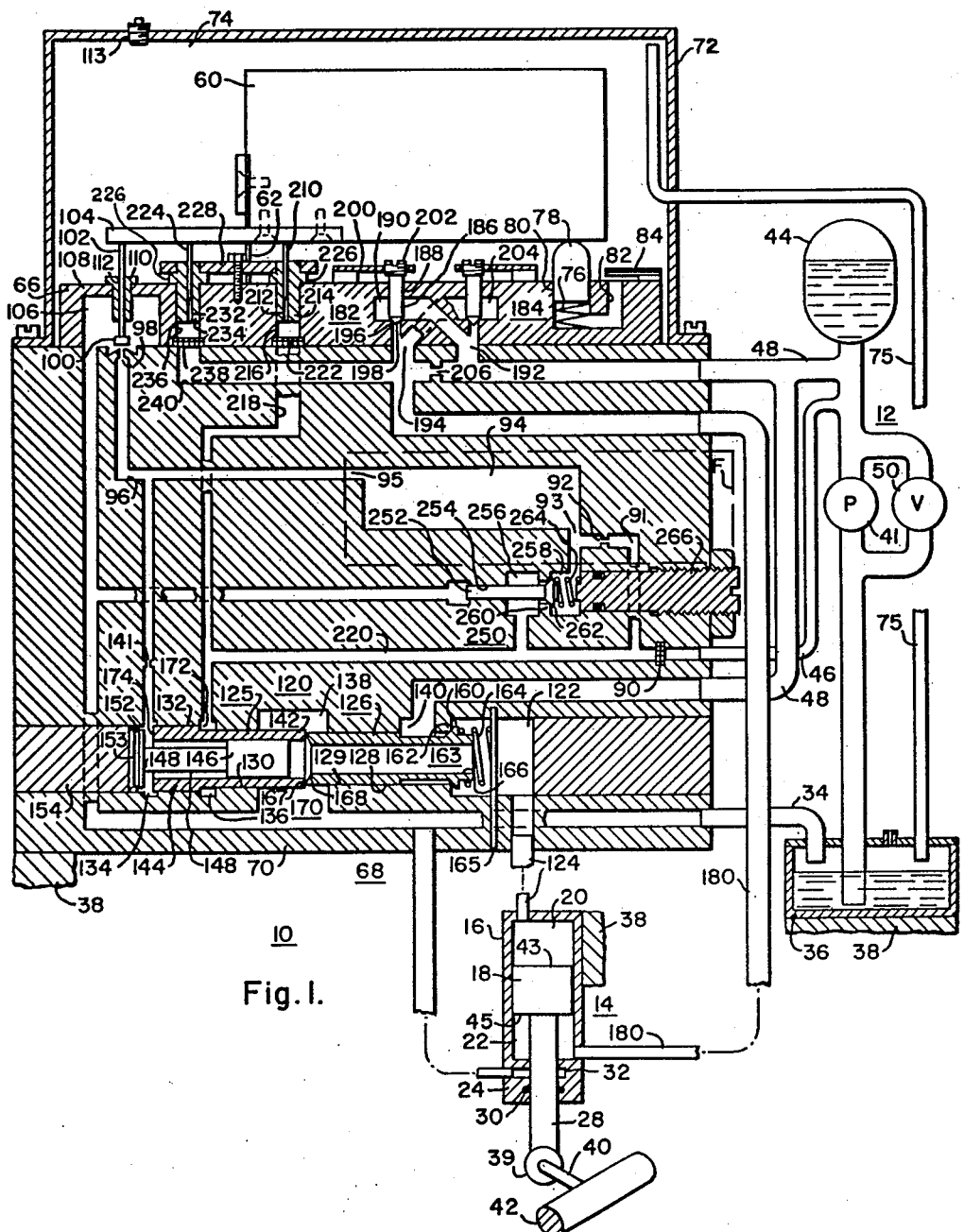
Figure 2:
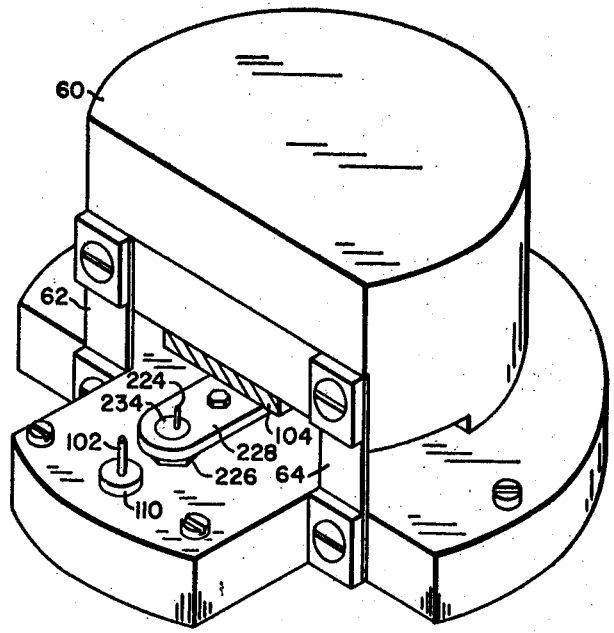
FIG. 2 is a perspective view of a portion of FIG. 1 to clarify details of that portion.

In FIG. 1 there is indicated by the general reference numeral 10, an acceleration responsive sensing and control unit for controlling the flow of fluid between a fluid pressure supply system 12 and a fluid power actuator-type shock absorber 14. By way of example, the system is hydraulic, and the fluid may be oil. The actuator 14 includes a hollow cylinder 16 having slidably disposed therein a piston 18 which divides the cylinder into expansible chambers 20 and 22. The lower end of the cylinder 16 is closed with a fluid sealing slip bushing 24 having an internal annular surface providing a bearing for a piston rod 28 connected to the piston 18. In a practical example, the relative diameters of the piston 18 and connecting rod 28 were arranged to provide an approximately two to one ratio between the areas of the piston's upper and lower pressure faces 43 and 45. The bearing surface of the bushing 24 is provided with a packing gland 30 and an annular, high pressure leakage trapping groove 32 connected to a return line 34 leading to a reservoir 36 in the fluid power supply system 12. The cylinder 16 is coupled to the sprung mass 38 of a vehicle, for example, its frame. On the other hand, the outer end of piston rod 28 is coupled through a bearing 39 to a bracket 40 attached to the unsprung mass of the vehicle, for example, an axle 42. It is to be understood that the vehicle includes a sprung mass such as frame and body coupled through springs to an unsprung mass such as axles and wheels.

In addition to the return line 34 and reservoir 36, the fluid power supply system 12 includes a fluid pump 41, whose intake is connected to the fluid reservoir 36, and whose output is connected to an accumulator 44 and to pilot and main supply lines 46 and 48, respectively. An unloader valve 50 connected across the pump sets the pressure level of accumulator 44 by passing fluid when the desired pressure has been reached. Although the supply source 12 is shown as supplying fluid under pressure to only one shock absorber, such a supply source may be employed to supply a plurality of shock absorbers. Each wheel position of a multi-wheeled vehicle may be provided with a shock absorber and associated sensing and control unit of the type disclosed herein.

The unit 10 houses many components of the system, including valves and an inertia element 60. The latter is a relatively heavy mass, and is supported for pivotal movement around an axis lying to one side and below its center of gravity by a flexible mounting, such as the leaf springs 62 and 64, secured to a top section 66 of a control block 68 which is an integral body formed by two main sections including section 66 and a bottom section 70. A fluid-tight cover 72, secured to the block 68, forms a chamber 74 and surrounds the inertia element 60 without impeding its movement. Fluid from the chamber returns to the reservoir 36 through a return pipe 75. In response to a vertical or a lateral acceleration of the sprung mass 38, the inertia element 60 will tend to rotate either clockwise or counterclockwise around its pivot, depending upon the direction of acceleration. For example, in response to upward or to leftward accelerations as viewed in FIG. 1, the sensing mass 60 will rotate clockwise. On the other hand, in response to either downward or rightward acceleration as viewed in this figure, the sensing mass 60 will rotate counterclockwise around its pivot.

The inertia element 60 is biased in a neutral position by a spring 76 which urges a piston plunger 78 against the bottom of the sensing mass 60. Plunger 78 slides in a bore 80 connected through a temperature controlled restricted passage 82 to the chamber 74, which chamber is filled with fluid in a manner later described. Temperature control of the degree of restriction is effected by a bimetallic element 84 over the passage 82. This arrangement provides constant damping for the sensing inertia element 60 at any temperature.

Pilot supply line 46 is connected through a filter screen 90, a passage 91, a metering orifice 92, a passage 93, a high frequency filter 94 and a passage 95, to a pilot controlled pressure line 96, which terminates in an orifice 98 whose size is controlled by a pilot valve 100 having a stem 102 that is in contact with and follows the movements of an arm 104 attached to and extending from the inertia element 60. The filter 94 is an oil-filled cavity in block 68 with sufficient volume to provide the required compliance for attenuating system frequency response above a desired operating range. Pilot valve 100 and orifice 98 are enclosed in a chamber 106 formed in part by a wall 108 in block section 66, which wall is provided with an aperture that has extending therethrough a guide plug 110 with an aperture 112, through which the stem 102 of valve 100 slidably extends. Fluid leakage from the chamber 106, past the slide fit of the valve stem 102 into chamber 74, together with other leakages, fills chamber 74 with fluid. These leakages fill the chamber 74 rather slowly, and it is desirable at the time of initial installation to pour fluid into the chamber through a normally plugged aperture 113 in the cover 72. Since the flow through the orifice 98 is controlled by valve 100 whose position is determined by that of the inertia element 60, the pressure variation in line 96 is a function of the position of the inertia element.

The shock absorber 14 is controlled by a supply and exhaust power valve arrangement 120 responsive to the pilot controlled pressure and located within block 68 and connected through a chamber 122 and a passage 124 to the upper chamber 20 of the shock absorber. The arrangement 120 includes hollow cylindrical valve members 125 and 126 arranged in tandem for slidable axial movement within a cylindrical bore 128 having a stepped contour with sections 129, 130 and 132 of different diameters. Axially spaced along and open to the bore 128 are a number of fluid pressure chambers 134, 136, 138 and 140. Pressure chamber 134 is connected through a restriction 141 to the pilot controlled pressure line 96. Pressure chamber 136 is connected to the pilot supply line 46. Chamber 138 is coupled to the return line 34, and chamber 140 is connected to the main supply line 48. Pressure chamber 122 is at the right end of bore 128.

Cylindrical valve member 125 has a reduced portion 142 and an enlarged portion 144 to conform with the adjacent sections 130 and 132 of the bore 128. A "stationary" piston plug 146 is disposed with a piston fit within the cylindrical member 125, and is fixed at the end of a rod 148 attached to a base plug 150 resiliently but tightly fitted within the enlarged section 132 of bore 128 by means of an O-ring 152 fitted in an annular groove 153 in the perimeter of the plug 150. Plug 150 bears against a structure plug 154 closing the left end of bore 128. The purpose of plug 146 will be described later.

At the right end of cylindrical member 126 there is an annular valve closure 160 which cooperates with an annular valve seat 162 to form a supply valve 163, which when opened connects the supply chamber 140 to chamber 122 which in turn is connected to the upper chamber 20 of cylinder 14. A bias spring 164 urges member 126 in a direction toward closure of the supply valve. A thin pin 165 provides a stop for the spring 164 and the valve member 126 without impeding fluid flow between chamber 122 and a passage 166 extending axially through valve member 126.

The right end of cylindrical member 125 is provided with an annular valve closure 167 which cooperates with an annular valve seat 168 on the adjacent left end of cylindrical member 126 to form an exhaust valve 170, which when open connects chamber 138 with the upper chamber 20 of actuator 14 through the passage 166, chamber 122 and passage 124.

The annular step between the two diameters of member 125 provides a piston face 172 which is subject to accumulator pressure through chamber 136 to urge the member 125 leftward (FIG. 1), tending to open the exhaust valve 168. Member 125 is urged in the opposite direction by the pilot controlled pressure in chamber 134 acting on the end piston surface 174 of member 125, thus tending to close the exhaust valve 170.

It may now be stated that the primary function of piston plug 146 is to permit both exhaust and supply valves to have large perimeters without requiring the driving piston of the exhaust valve to be larger in area. The larger valve perimeter not only increases the speed of the valves but also permits the supply valve to have a large bore within it for the passage of oil to the exhaust valve 170 when that valve is open. When member 125 travels to the right (FIG. 1) from an open position of exhaust valve 170, contact is first made between seat 168 and closure 167 to close valve 170, and upon further movement to the right of member 125, member 126 is moved to the right to open the supply valve 163. When the system is quiescent, that is, when it is not responding to accelerations as later described, the balance of forces on members 125 and 126 is such that both the exhaust and the supply valves 170 and 163 are closed.

As hereinbefore stated, the pilot controlled pressure in line 96 is determined by the position of the inertia element 60. In response to clockwise movement of the inertia element, the pilot valve 100 follows the upward movement of arm 104, thus reducing the pilot controlled pressure in line 96. There is always sufficient pressure in line 96 to push the valve 100 upward to force its stem 102 into contact with the arm 104, so that valve 100 follows the movement of arm 104. Counterclockwise movement of the inertia element 60 forces valve 100 downward, thereby restricting the orifice 98 and increasing the pilot controlled pressure in line 96. From the foregoing description, it should now be apparent that, through the pilot controlled valve system 120, the upper chamber 20 of the actuator 14 is connected to the accumulator main supply line 48 in response to counterclockwise movement of the inertia element 60, from the quiescent reference and to the exhaust line 34 in response to clockwise movement of the inertia element 60 from the reference position.

Chamber 22 of the actuator 14 is connected through a line 180, and a pair of oppositely "poled" damper valves 182 and 184 to the main supply line 48. The damper valves are one-way valves, and each is biased to a closed position by a spring under static conditions. Damper valve 182 includes a rod 186 slidably disposed in a bore 188 which extends from the exterior surface of block section 66 to a chamber 190 that is connected through a chamber 192 to the main supply line 48. Chamber 190 is demarked from a chamber 194 by a valve seat 196 which cooperates with a valve closure 198 formed at the lower end of rod 186. The valve closure 198 is urged toward the seat 196 by the free end of a flat spring 200 secured to the top of block 66. Actual contact between the spring 200 and the top of rod 186 is through an adjustable contact screw 202 extending through a threaded aperture in the free end of spring 200. For convenience, chambers 190 and 194 may be referred to as the upper and lower chambers of valve 182.

Valve 184 is similar to valve 182 and has corresponding parts. The upper chamber 204 of valve 184 connects with the lower chamber 194 of valve 182. Lower chamber 192 of valve 184 is coupled to the main pressure line 48 while the lower chamber 194 of valve 182 is connected through line 180 to the lower chamber 22 of actuator 14. The spring 200 and a major part of the valve rod 186 of each damper valve are located in low pressure zones that do not require heavy pressure proof surrounding structure such as would be required if these parts were located within a chamber of the valve as was the case in the system disclosed in the aforesaid U.S. patent application Serial No. 775,430.

Damper valve 184 responds to upward motion of the piston 18, of the actuator, allowing fluid to flow from the main supply line 48 through line 180 into the lower chamber 22 of the actuator. Damper valve 182 is oppositely "poled" with respect to damper valve 184, and responds to downward motion of the piston 18 and consequent contraction of chamber 22, causing flow of fluid through line 180 past the damper valve 182 and into the main supply line 48. A small orifice 206 shunts the damper valves 182 and 184 to linearize the flow through the valves. Without the orifice, the rate of fluid transfer past the damper valves is slow in the beginning of a difference of pressure and increases as the pressure rises. The action of the orifice is to provide an opposite action with a rapid increase of flow at the beginning and a smaller increase of flow as the pressure rises. The two actions combined result in a more nearly straight line response curve for the damper valves.

Variations in the accumulator pressure supplied by the pump 41 inherently affect the balance of the inertia element 60. To compensate for this, a pressure compensating piston 210 engages the bottom of the inertia element 60. This piston is positioned within an off-center bore 212 extending axially through a round plug 214 disposed with a snug rotatable fit in a bore 216 that connects through conduits 218 and 220 to the pilot supply line 46. A filter screen 222 is interposed in the line 218. With this arrangement, variations in the accumulator pressure will be reflected in a reaction of the piston 210 to compensate for changes of fluid force at the orifice 98 and at a later described piston 224 on the opposite side of the pivot axis of the inertia element 60. Thus, the inertia element 60 assumes the same average position for varying accumulator pressures. The position of piston 210 within the plane of the bottom surface of the inertia element 60 may be adjusted by turning the plug 214, thereby providing eccentric movement of the piston 210 around the axis of plug 214. To assist in turning the plug 214, it is provided near its upper end with a "hexagonal" shaped portion 226 for receiving a corresponding wrench. A screwdown strap 228 is used to clamp the plug 214 after it has been adjusted. The upper end of plug 214 passes loosely through an aperture in the strap 228.

In order to provide velocity control to the inertia element 60, a negative feedback piston 224, slidably disposed in an axial eccentric bore 232 of a plug 234, engages the underside of arm 104 to apply forces tending to oppose rotation of the inertia element in response to acceleration forces. Plug 234 is located in a bore 236 of block section 66, which bore communicates through a screen filter 238 and a line 240 to the line 180, which communicates with chamber 22 of the actuator 14. Thus, the response of the feedback piston 224 is proportional to the relative velocity of the movement of piston 18 reflected in pressure changes in chamber 22 above or below the accumulator pressure during fluid flow through one of the damper valves 182 and 184. Plug 234 is similar to and adjustable in the same manner as plug 214. Like the latter, plug 234 is also provided with a hexagonal wrench receiving portion 226 and is clamped with the same clamping strap 228.

Operation of the system of FIG. 1 is as follows. Assuming that the sensing and control unit 10 is mounted on the sprung mass 38 along with the fluid supply system 12, with the cylinder head of the actuator 14 also secured to the sprung mass 38, and the piston rod 28 connected to the unsprung mass 42 through bearing 39, the following operation will take place. If in passing over a roadbed, the undercarriage or unsprung mass 42 of the vehicle momentarily encounters a rise in the roadbed, a force will be delivered through the springs and the shock absorber to the sprung mass 38 in an upward direction (FIG. 1). This acceleration will in turn cause the inertia element 60 to rotate clockwise about its pivotal axis causing the pilot valve orifice 98 to be relieved, allowing greater fluid flow through the orifice and resulting in a reduction in pressure in the pilot controlled pressure line 96. The reduction in pressure in line 96 causes the member 125 to move to the left (FIG. 1) and disengage from member 126, thereby opening exhaust valve 170, and resulting in fluid being discharged from the upper chamber 20 of the shock absorber 14 through the exhaust valve 170 and into return line 34. The disengagement of members 125 and 126 results in a more firm seating of the supply valve 163.

When the fluid discharge from chamber 20 of the shock absorber occurs, a rapid reduction in pressure within this chamber takes place, allowing the piston 18 to move rapidly upward in response to the uneven terrain. The pressure from the accumulator in chamber 22 causes the force from the underside of the piston 18 to exceed the force on the upper side with the result that upward accelerations of the sprung mass are greatly impeded. The raid upward movement of piston 18 reduces the pressure within the chamber 22 causing the damper valve 184 to open and supply more fluid to chamber 22. The reduction in pressure within chamber 22 also results in a reduction of the force imposed on the pilot valve control arm by the feed-back piston 224. This action tends to reduce the flow through the pilot valve orifice 98 with the result that damping of the resonances of the vehicle masses occurs.

If the vehicle wheel strikes a depression in the road surface, resulting in a separation of the sprung and unsprung masses, there will be a pressure rise within chamber 22. The increase in pressure within chamber 22, as piston 18 attempts to move downward along with the unsprung mass, causes the sprung mass to attempt a following action. The downward acceleration of the sprung mass causes a counterclockwise movement of the inertia element 60 about its pivot, resulting in a restriction of the orifice 98 and a build-up of pressure within the pilot pressure line 96. This in turn results in an opening of the supply valve 163 and a more firm seating of the exhaust valve 170. Opening of the supply valve 163 results in an increase in pressure within chamber 20, aiding the piston 18 in its downward movement due to the separation of the sprung and unsprung masses. The resultant increase in pressure within chamber 22 is then relieved through damper valves 182 into the main pressure line 48. This rise in pressure within chamber 22 also results in a feedback pressure increase on piston 224, tending to rotate the inertia element 60 clockwise, thereby providing velocity stabilization of the initial action of the inertia element 60.

The most linear portion of the valve travel versus output pressure (pressure in line 96) characteristic of the pilot valve controlled orifice 98 is between 50% and 100% of full pressure output. Full pressure output is when the orifice 98 is completely closed by the pilot valve 100. In order to operate this system on the more linear portion of the pilot characteristic, the various forces are balanced to provide a quiescent operating point at approximately 75% output of the pilot controlled orifice. For compatibility with this operating range, the piston surfaces 174 and 172 of the member 125 of the supply and exhaust valve system 120 bear an approximate 2 to 1 ratio.

If, for example, the accumulator pressure is 1500 p.s.i., and the pilot valve is biased for quiescent operation at 1125 p.s.i. (middle of range between 50% and 100% output), then the piston surface 174 is subject to an average pressure of 1125 p.s.i., and piston surface 172 is subject to a fluid pressure of 1500 p.s.i. (accumulator pressure). In addition to the accumulator pressure on piston surface 172, the member 125 has applied to it in the same direction a "lift" pressure on the end area (right end) circumscribed by the closure member 167 of approximately 750 p.s.i., the pressure of the upper chamber 20 of the shock absorber 14. It will be recalled that the ratio of the upper area 43 of piston 18 to that of its bottom area 45, is approximately 2 to 1. At quiescent, chamber 22 of the actuator 14 is subject to the accumulator pressure 1500 p.s.i., and therefore the upper chamber 20 of the actuator 14 is under approximately 750 p.s.i. pressure, thus accounting for the "lift" pressure on the right end of member 125. At quiescent, the supply and exhaust valve system 120 is balanced to a closed position for both supply and exhaust valves. The spring 164 just overcomes the opposing forces on member 126 to provide a net closing force to the supply valve 163. Exhaust valve 170 is provided with a net closing force resulting from the force due to pilot controlled pressure on piston surface 174 in one direction, and a slightly less force in the opposing direction due to pilot supply line pressure on piston surface 172 plus the "lift" pressure on the right end of member 125. The diameter of the right end of member 125 is slightly greater than that of the left end of member 126 to insure seating of the exhaust valve, and to reduce the "lift" area at the right end of member 125 by such an amount that full system pressure may be obtained through the supply valve with less than full system pressure in the pilot controlled pressure line.

Due to wear or maladjustment, the pilot valve 100 may open excessively and permit the exhaust valve 170 to move to its maximum opening which may result in liquid hammering. To prevent the pilot controlled pressure from ever falling below a desired minimum, for example, approximately half system pressure, and thus cause excess lifting of the exhaust valve, a minimum pressure valve 250 is inserted in the circuit between the pilot supply line 46 and the pilot pressure line 96 in a position to bypass the metering orifice 92 when the minimum pressure valve is open. Valve 250 includes a stem 252 axially slidable in a bore 254 in block 68. Bore 254 opens into a chamber 256 connected to the pilot supply line 46 and demarked from a pressure chamber 258 by an annular valve seat 260, which cooperates with a valve closure 262 at the right end of the stem 252 (FIG. 1). A spring 264 urges the closure 262 toward the seat 260. When valve seat 260 and valve closure 262 are engaged, valve 250 is in a closed position blocking chamber 256 from chamber 258.

Chamber 258 is connected through passgae 93, the frequency filter 94, and the passage 95 to the pilot control pressure line 96. The dimensions of the valve, the area ratios on opposite sides of the valve closure 262, and the spring force 264 are arranged so that at or under a desired minimum pressure in chamber 258, the accumulator pressure from line 46, applied through chamber 256 to the left side of the valve head 262, will drive the closure 262 to an open position to allow more fluid to flow into the pilot pressure circuit, thereby raising the pressure of the pilot controlled pressure line 96 above the predetermined minimum. Should the maximum pilot valve opening, because of maladjustment or wear be greater than that for which the control pressure drops to approximately half of the accumulator pressure, the minimum pressure valve 250 will pass sufficient additional oil to prevent further falling of the control pressure and to restore the pressure. Thus, the exhaust valve is prevented from lifting so far from its seat as to cause liquid hammering.

By way of example and in conformance with the pressures mentioned, the ratio between the area on the right side of the valve closure 262 to the area on the opposite or underside of the valve closure is approximately 2 to 1. Liquid passing through the valve upon its opening emerges at approximately half pressure because this pressure can force the valve closed by bearing upon the full area of the mushroom head of the valve stem 252, which area as stated, bears a ratio of approximately 2 to 1 to the annular area underneath the valve which is acted upon by the accumulator pressure through chamber 256. The pressure of spring 264 is adjusted by a screw member 266 to bring the output pressure to a desired value despite variations in the above area ratio due to manufacturing tolerances. In the particular circumstance, the valve proportions were made to produce slightly more than 50% pressure in the output and the adjustable spring was brought into play to reduce this pressure to the desired value.

Although the desired operating range of the system is below 20 cycles per second, the system is subjected to oscillations and pressure variations above the desired frequency range. In a practical example, the filter 94 was arranged to have a delay of approximately .02 second in combination with the metering orifice 92 and pilot valve resistances to attenuate the response of the system above its needed range of about 0–20 cycles per second. With a feed orifice of approximately .015 inch, an oil volume of approximately 2 cubic inches will provide sufficient compliance to provide such a delay. Cut off frequency is reduced as delay is increased, and delay is increased by reducing the orifice or by increasing the oil cavity volume. It may be noted that the oil cavity filter 94 is arranged so that fluid flows in at the bottom and flows out at the top in order to scavenge the air out of it and avoid excessive compliance because of the compressibility of the entrained air.

Figure 3:
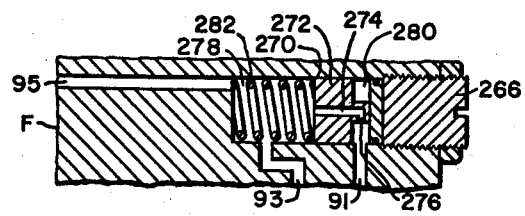
FIG. 3 is a sectional view of an alternative frequency variation filter which may be substituted for that shown in the dashed line box in FIG. 1 and referenced at F.

Alternatively, the spring piston type of filter in FIG. 3 may be substituted for the oil volume compliance of FIG. 1. The dashed box F of FIG. 3 is substituted for the dashed box F of FIG. 1. The filter in FIG. 3 includes a cylinder bore 270 in which is disposed a spring biased piston 272 having an axial passage 274 terminating in a metering orifice 276. The piston divides the bore into two chambers 278 and 280. Chamber 278 is connected to chamber 258 and to pilot pressure line 96, while chamber 280 is connected to the pilot supply line 46. The right end of piston 272 is provided with a stop which limits the movement of the piston to the right to prevent a complete collapse of the chamber. A spring 282 biases the piston to the right against the pilot supply pressure. In operation the piston "floats" intermediate the ends of the bore, and provides in the oil volume and the spring sufficient compliance to provide the necessary delay. Because of the passage 274 through the piston, the spring is on the pilot pressure side. This allows the spring to be small because only a low average energy must be stored.

Figure 4:
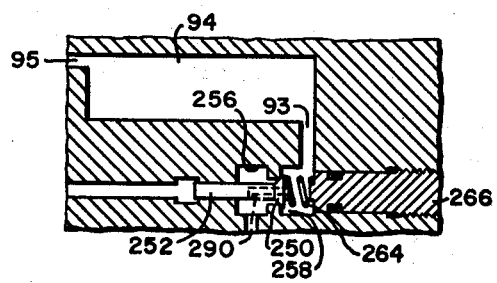
FIG. 4 illustrates an alternative location of a metering restriction in the pressure supply line to the pilot circuit.

An alternative for orifice 92 is shown in FIG. 4. In this figure, orifice 92 and passage 91 are eliminated, and an orifice 290 located in the stem 252 of valve 250 communicates between chambers 256 and 258. Orifice 290 is effectively in parallel with valve 250 and provides the equivalent function of orifice 92.

It is to be understood that the herein described arrangements are simply illustrative of the principles of the invention, and that other embodiments and applications are within the spirit and scope of the invention.

We claim as our invention:

1. In a fluid power stabilizing system for a vehicle having a fluid power actuator, a body, inertia sensing means for controlling the flow of fluid in and out of said actuator, said sensing means comprising a mass pivotally carried by said body, said body having a surface facing a surface of said mass, said body having a bore open to said body surface, a first plug in said bore, said plug having an axial off-center bore extending therethrough, a reciprocable fluid pressure operated piston in said off-center bore and extending into contact with said surface of the mass, said first plug being rotatable for adjusting the contact position of said piston along said surface of the mass.

2. In a fluid power system, a body, inertia sensing means for controlling fluid flow in said system, said sensing means comprising a mass pivotally carried by said body, means defining a first surface integral with said mass, said body having a second surface facing said first surface, said body having a bore with an outer end open to said second surface, a plug in said bore, said plug having an axial off-center bore open to the outer end of the plug, a reciprocable piston in said off-center bore and extending into contact with said first surface, said plug being rotatable for adjusting the contact position of said piston along said first surface, a fluid circuit communicating with the inner end of said off-center bore, whereby the inner end of said piston is in power transfer relation with said fluid circuit.

3. In a fluid power stabilizing system for a vehicle having a fluid power actuator, a body, inertia sensing means for controlling the flow of fluid affecting said actuator, said sensing means comprising a mass pivotally carried by said body, means defining a first surface integral with said mass, said body having a second surface facing said first surface, said body having a bore with an outer end open to said second surface, a plug in said bore, said plug having an axial off-center bore open to the outer end of the plug, a reciprocable piston in said off-center bore and extending into contact with said first surface, said plug being rotatable for adjusting the contact position of said piston along said first surface, a fluid circuit communicating with the inner end of said off-center bore, whereby the inner end of said piston is in power transfer relation with said fluid circuit.

References Cited in the file of this patent

UNITED STATES PATENTS 2,860,889    Hanna _____ Nov. 18, 1958

FOREIGN PATENTS 831,949    Great Britain _____ Apr. 6, 1960